United States Patent

[11] 3,566,004

[72] Inventor John P. Creedon
Woodland Hills, Calif.
[21] Appl. No. 855,293
[22] Filed Sept. 4, 1969
[45] Patented Feb. 23, 1971

[54] COLOR-CODED TELEPHONE CONDUCTOR TERMINAL
9 Claims, 5 Drawing Figs.

[52] U.S. Cl. .......... 174/60, 179/98, 317/122, 339/18, 339/113
[51] Int. Cl. .......... H01r 13/46; H01b 7/36
[50] Field of Search .......... 174/60, 112; 179/98; 317/118, 122; 339/18 (C), 113 (B)

[56] References Cited

UNITED STATES PATENTS

| | | | |
|---|---|---|---|
| 2,787,773 | 4/1957 | Potter .......... | 339/113X |
| 3,031,524 | 4/1962 | Hicks .......... | 174/112 |

FOREIGN PATENTS

| | | | |
|---|---|---|---|
| 349,497 | 5/1931 | Great Britain .......... | 174/60 |

*Primary Examiner*—Laramie E. Askin
*Assistant Examiner*—Gerald P. Tolin
*Attorney*—Miketta, Glenny, Poms and Smith

ABSTRACT: In a telephone communications system including cables interconnecting a first location with a second location through at least one terminal, each of the cables including pairs of telephone conductors, each pair including different colored conductors, no two pair having the same two different colored conductors so that each pair is individually color identifiable, an improvement in the terminal comprising a terminal board having a front and rear face and supporting a plurality of lugs extending from the rear to the front face and arranged in substantially straight lines comprising rows and columns, each of the rows bearing a color which may be matched to one of the colors in the conductor pairs, and adjacent lines of lugs comprising two different colored lines and no two pair of lines having the same two different colors, and column identification indicia, each such column comprising a plurality of lug pairs and each pair including one lug from one of the pairs of adjacent different colored lines of lugs so that pairs of conductors in an input cable may be selectively connected to a pair of conductors in the output cable through jumper wires attached to lug pairs at the front face of the board which identify the two different pairs of colored conductors which it is desired to interconnect through the terminal board.

INVENTOR.
JOHN P. CREEDON
By
Miketta, Glenny, Poms & Smith
ATTORNEYS.

COLOR-CODED TELEPHONE CONDUCTOR TERMINAL

BACKGROUND OF THE INVENTION

As is generally well known, the telephone industry employs a network of cables interconnecting central telephone offices, distribution terminals, and residential or business buildings. For many years, these interconnecting cables were lead covered with individual conductors therein being paper insulated. Later, cables and conductors were plastic coated and still more recently the conductors became sheaved in color coded plastic.

These cables generally run from the central office and terminate on lugs which are generally grouped together and housed in a weather resistant housing called a terminal. Distribution terminals of this type normally range in capacity from four to 50 pairs of telephone conductors. Other terminals commonly called "cross-connect" terminals having a capacity of several hundred pairs are also used in larger distribution control points. The term "terminal" is used herein to refer to an installation at which conductors pairs are terminated without regard to size or to location within the system, and including the central office.

Regardless of the type of cable and conductor covering, all cables are identified by cable number and pair number in the central office when they are terminated on what is generally known as a "main frame." When a cable pair is terminated at the central office and assigned a cable and pair number, for example Cable 27, Pair 172, this identification is rarely changed and the identification number is stamped on the main frame hardware to which the pair is connected. When a cable conductor is terminated in the field, irrespective of the type of terminal, it is imperative that the conductor be identified by cable and pair number which matches the cable and pair number in the central office. Accordingly, this information is usually stamped on the terminal or placed on an individual tag adjacent to the terminal. For example, an identification tag may read: Terminal 2762, Cable 14, Pairs 125 to 150. The standard system for numerical identification is to identify lugs on the terminal by counting from top to bottom and left to right. Where the conductors in the cable are not color coded and must be identified at the terminal, each conductor must be identified by sending a tone on the conductor to the central office. This tone can be located at the central office within a hundred pair and it is then necessary to test each pair until the pair on which the tone is impressed can be identified. While occasionally the tone is sent from the central office and picked up in the cable using an amplifier, this method has been found to be too slow and is used only when a few pair require identification.

Where the individual conductors in the cable are color coded, the problem of a pair identification at the terminal is greatly simplified, since the color code will enable a craftsman to immediately identify the pair. In other words, it is only necessary to match the central office number with a particular color coded pair by a device provided to craftsman which correlate the color code with pair number.

The pair, as identified by the system described above, is then connected by the craftsman to lugs on the rear face of the terminal board and in the case of a cross-connect terminal, pairs from the distribution cable are similarly attached to other lugs at the rear of the board. On the front face of the terminal board, however, it is still necessary to stamp, stencil, tag or in some way identify the individual pair in the terminal attached to that particular pair of lugs by cable and pair number. The cable and pair number is thus identified on the front face of the terminal. However, it is not uncommon for a terminal to change cable and/or pair identification several times during a year as service through that terminal is changed, modified or increased. Since the same pair of lugs are now attached to a different pair and cable number, it is necessary to restencil or reidentify such lugs with the new number. Constant rearrangement in the field is expensive to accomplish, burdensome to the craftsman, time consuming, subject to recurring error, and is aggravated in large terminals comprising several hundred pairs of conductors. In such large terminals, moreover, there is very little area alloted for stamping or stenciling because to provide adequate space renders the terminal housings too bulky and objectionable to the general public.

Because of the restenciling as identifications are changed, eventually the front face of the terminal only poorly identifies the particular pair attached to a pair of lugs. If an installer is seeking a particular pair at the front face of the terminal to which a new pair, for example, are to be connected, he can generally locate a region of lugs to which the pair identification belongs. To find the specific lugs an installer may resort to dialing the particular pair letting the pair ring and shorting each pair in the lug region until he has shorted the pair which he has dialed. In this manner, the lugs corresponding to a particular pair number can be finally identified. This procedure, however, constitutes a circumvention of telephone communication company management policy.

Another technique which has been used to attempt to avoid the identification problems in the field, is to avoid connecting the conductors from the two source points through the terminal board et al. Instead, the two pair are simply spliced to obtain the proper connection. Where constant rearrangement of conductor pairs is required in the field, as is quite common, the multitudinous splices performed by installers, who are generally not adept in performing a good splice, results in a tangled, messy, confusing and inefficient system.

To avoid the above-described defects, the present invention provides a terminal board wherein the color coded pairs attached to the rear face of the terminal board can be immediately and directly identified on the front face of the terminal board by a lug identification color code which corresponds to the wire color code. Another object of the present invention is to provide a telephone conductor pair terminal board in which color coded pairs from a central office or larger distribution point attached to the rear face of a terminal are immediately identifiable by color at the front face of the terminal without requiring any words or numbers to identify the pair attached to a particular pair of lugs. It is thus a broad object of the present invention to simplify the connection of two pairs of telephone conductors in the field by providing a color coded terminal board which carries the color coded wire identification system from the wires to the board itself.

It is another object of this invention to provide a color coded terminal board which will facilitate the initial connection of wire pairs to the terminal board and subsequent changes in wire pair lug connections as service through the terminal board is altered. Finally, it is an advantage and object of the invention to provide a color coded terminal board which will substantially decrease the expense in connecting and changing wire pair connections from one pair of lugs to another by decreasing the labor required to effect such connection or change and by providing a code which can be inexpensively applied to the terminal board.

SUMMARY OF THE INVENTION

In a telephone communication system including cables interconnecting a first location to a second location through at least one terminal, each of the cables including a plurality of telephone conductor pairs, each conductor pair in each of the cable groups being color differentiated from every other conductor pair in that group within the cable, an improvement in the terminal comprising a terminal board having a front and rear face, a plurality of lugs extending from the front face to the rear face of the board, the lugs being arranged in substantially straight lines comprising rows in one direction and columns in the normal direction, means for visual identification of lug pairs comprising means for color identification of each line of lugs extending in one direction, each of the lines of lugs being of a single color and each pair of adjacent lines differentiated from every other pair of adjacent lines, and each pair of adjacent colored lines matching one of the pair of colored conductors, and indicia means for identification of each line of lugs extending in the normal direction each such column comprising a plurality of lug pairs and each of such pairs including one lug from one of the pairs and each of such pairs including one lug from one of the pair of adjacent color differentiated lines, pairs of conductors in the cable from the first location to the terminal connected to lug pairs having matching color identification at the rear face of the board and in the case of cross-connect terminals, pairs of conductors in the other cable interconnecting the second location with the terminal connected to other lug pairs of matching color identification at the rear face of the board, and jumper wires selectively interconnecting one pair of identifiable lugs to which a conductor pair in the first cable is connected to another pair of identifiable lugs to which a conductor pair in the second cable is connected so as to selectively interconnect a pair of conductors in the first cable to a pair of conductors in the second cable through the terminal board.

BRIEF DESCRIPTION OF THE PREFERRED EMBODIMENT

Figure 1:
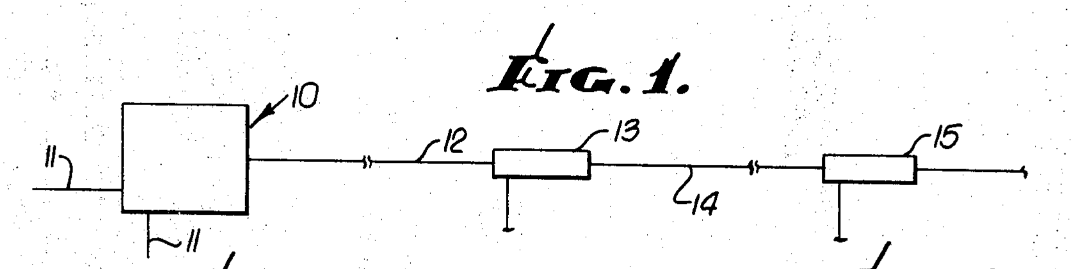
FIG. 1 is a schematic illustration of a telephone system in which the present invention is employed.

Referring to FIG. 1, there is shown a portion of a telephone communications system which generally includes a central office or first location (not shown) which is connected to a terminal 10 through a cable 11. This type of terminal is commonly referred to as a "cross-connect" terminal or an "access point" terminal. Many of such terminals are included in the vast telephone communications distribution system. The terminals are connected to the central office through the first or input cable 11, it being understood that such cable may not be directly connected to the central office but may pass through other terminals in the system prior to terminating at terminal 10.

A second or output cable 12 extends from the terminal 10 to a second location and ultimately to the consumer or user. Ordinarily, cable 12 is connected to a smaller distribution terminal indicated at 13 for servicing a limited number of distribution points or ultimate users and continues through a cable 14 to a second distribution terminal 15 and so forth until each of the conductor pairs in the cable 12 are eventually terminated.

Major cables, such as cable 11, may house or comprise 600 pair of telephone conductors though larger or lesser numbers are not uncommon. A cross-connect terminal may have a 600 pair capacity in the ordinary system while a distribution terminal is of much smaller capacity handling from four to 50 pair of telephone conductors. Presently, cables that are 600 pair and smaller are color coded which simplifies pair identification and correlation with cable and pair number information stored in central records. A color-coded system has been adopted throughout the telephone industry and this code must be generally understood to appreciate one of the primary advantages of the present invention.

It will be understood that the term "colored conductor" is used herein to refer to a conductor which is color coded, e.i., has a sheath (insulation) which is color impregnated. In the standard color code system used throughout the country, there are 10 colors which are used to differentiate conductors and these are: blue, orange, green, brown, slate (gray), white, red, black, yellow and violet. Ten color-coded conductors can be arranged to provide 25 color differentiated or identifiable pairs of conductors. These pairs are commonly referred to as the "blue-white pair," the "orange-yellow pair," the "black-green pair," or the like. These 25 color-differentiated pairs comprise what is commonly known as a "group" and each group is in turn color identified by providing a binder or similar means for maintaining the pairs in a group while bearing two different colors selected from the same ten colors previously identified so that 25 groups may be distinguished. Since the standard plastic conductor cable has only 600 telephone conductor pairs, normally, only 24 groups are used, the last group, i.e., the violet-slate group generally being eliminated. Thus, a pair in a cable may be identified by color such as the "blue-white pair in the brown-red group."

In practice, a telephone line is identified at the central telephone office by cable number and pair number which is generally stamped on a main frame to which the pair comprising the line are attached. This pair is fed into a cable which may initially include more than 600 pair in which event the individual conductors, pairs, and groups are not color coded. When distribution from such major cable is effected such that the distribution cable will comprise 600 pair or less, the color-coded system will be employed by tagging each of the non-color coded conductors in the major cable, splicing the colored conductor thereon, and then recording at the central office the color code of the pair which constitutes a telephone line that is also identified by cable number and pair number.

The 600 pair or less color-coded cable comprises the input cable 11 in the portion of the telephone distribution system which has been described in reference to FIG. 1. It will now be understood that each pair at the terminal in the input cable 11 is color coded and can be identified both by color and by cable number and pair number. Since normally the output cable will be 600 pair or less, this cable is also color coded. It is in this system, that the present invention is employed to provide a terminal 10 which generally comprises a terminal board, indicated generally at 20, a plurality of lugs, all of which are identical and indicated by the same reference numeral 30, means 35 for visual identification of lug pairs, and jumper wires 45 for selectively interconnecting pairs of lugs and thereby interconnecting a pair of conductors in the input cable with a pair of conductors in the output cable through the terminal board.

Figures 2, 3, 4, 5:
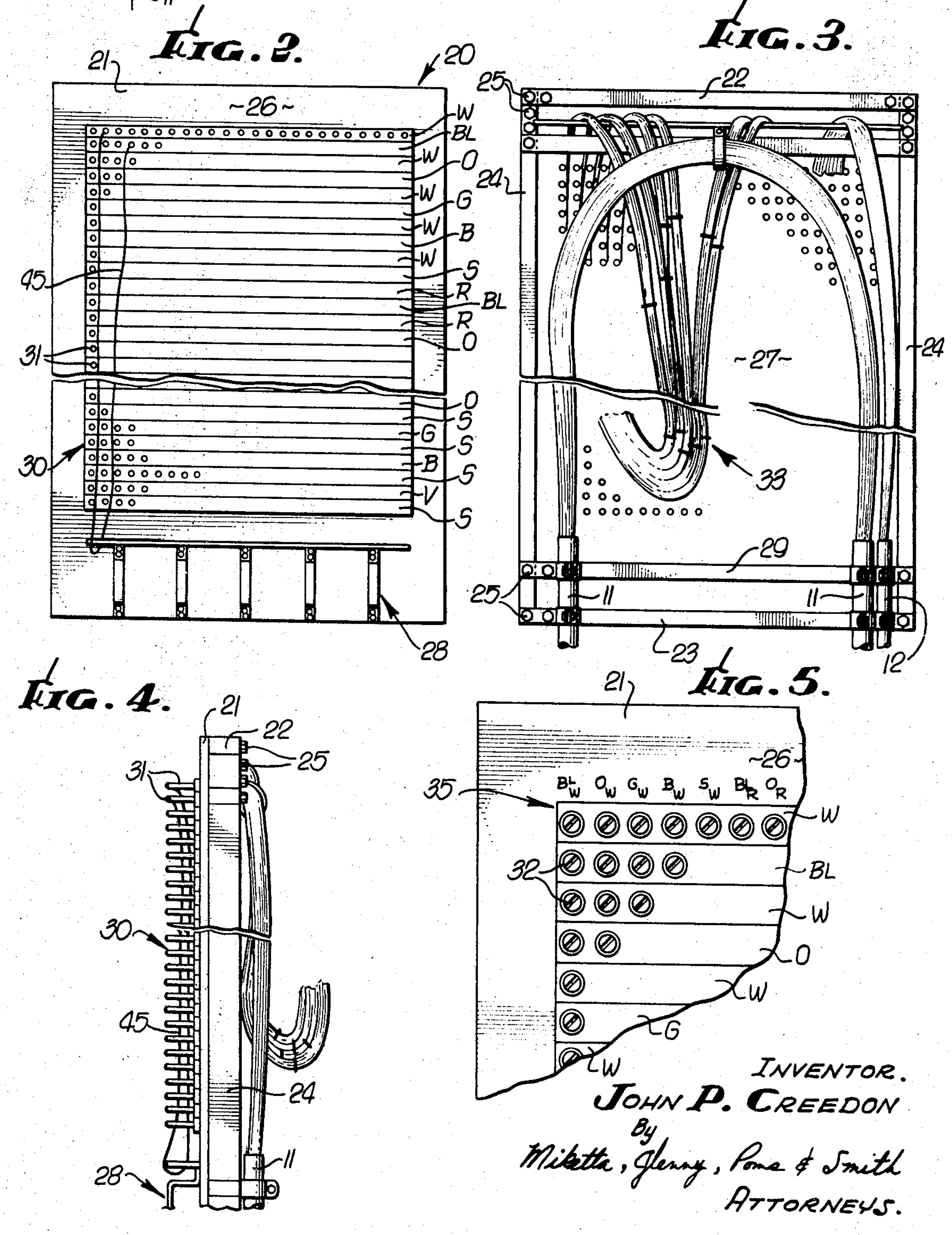
FIG. 2 is a front elevation view of an exemplary embodiment of a terminal board in accordance with the present invention.
FIG. 3 is a rear elevation view of the terminal board of FIG. 2 showing first and second cables to be interconnected through the terminal board.
FIG. 4 is a side elevation view of the terminal board of FIG. 2.
FIG. 5 is an enlarged partial front elevation view of the terminal board of FIG. 2.

The terminal board 20 in the exemplary embodiment provides means for terminating 600 pairs of telephone conductors although a board for terminating a lesser number of pairs may also employ the present invention. Such board may comprise a flat sheet 21 of nonconductive material generally disposed in a vertical plane on a frame or stand within a housing (not shown). A rectangular frame, as seen in FIGS. 3 and 4, comprising to and bottom frame members 22, 23 and side frame members 24 are secured to the sheet through bolts 25 or the like. A stable structure is thus provided. The front face of the terminal board is indicated at 26 while the rear face is indicated at 27. Secured to the front face 26 of the board is a bracket indicated generally at 28 for reasons to be explained more fully hereinafter. At the lower end of the rear face of the board 20 there is provided brackets 29 for securing the cables 11 and 12. It will be seen that the cables 11 and 12 have an outer sheath which is terminated within the terminal housing so that the pairs of telephone conductors are exposed over a substantial length. In the exemplary embodiment of the system shown, the input cable 11 does not completely terminate at the terminal 10 although a portion of the conductor pairs therein are terminated as will be more fully explained.

The plurality of lugs 30 are mounted on the terminal board and extend from the front to the rear face of the board as seen partly in FIG. 4. The lug may comprise a standard 31 which projects forwardly from the front face 26 of the board 20 and in which a screw 32 is received. A plurality of wire leads indicated generally at 33 are attached to the lugs 30 at the rear face of the terminal board. The lugs 30 are arranged in substantially straight lines comprising horizontal rows extending in one direction and vertical columns extending in the normal or 90° direction. The plurality of lugs are thus arranged into a large rectangle which in the exemplary embodiment includes 24 columns and 25 pairs or 50 lugs in each column.

The terminal also comprises means 35 for visual identification of lug pairs which in the exemplary embodiment comprises means for color identification of each line of lugs extending in the horizontal direction and indicia means for identification of each line of lugs extending in the vertical direction. Color identification of the horizontal rows of lugs is provided in the exemplary embodiment by coating, such as with paint, colored stripes on the forward face 26, of the terminal board 20 behind the row of lugs. As seen best in FIG. 2 in which different colored stripes are identified by a letter or letters representing the color, each pair of adjacent lines or rows of lugs comprise two different colored lines and no two pair of lug lines have the same two different colors. There are ten different colored stripes matching the ten different colored conductors which are to be terminated at the board. Each pair of adjacent colored rows match one of the pair of colored conductors, i.e., proceeding from top to bottom, blue-white, orange-white, green-white, brown-white, slate-white, blue-red, orange-red, etc. It will thus be appreciated that each pair of adjacent rows are color differentiated from every other pair of adjacent rows on the terminal board.

The indicia means for identification of each line extending in the normal direction, i.e, in the exemplary embodiment, the vertical columns, may comprise graphic indicia or characters indicated generally at 35 printed or otherwise disposed on the face 26 of the terminal board 20 adjacent at least one end of each vertical column of lugs. In the exemplary embodiment, such characters, symbols or graphic indicia comprise an alphabetical code wherein a letter or pair of letters comprise a symbol representing each of the ten colors. Two of such symbols are disposed at the upper end of each of the columns. As seen in FIG. 5, such symbols comprise an abbreviation of one of the 10 colors employed on the conductors and on the horizontal stripes on the face of the terminal board. For example, blue is represented by the letters BL, orange by the letter O, etc. Thus, in the same manner that two conductors are color differentiated, pairs of adjacent rows or lugs are color identified, each vertical column of lugs is color identified by indicia representing two colors. Rather than graphic indicia, it will be understood that the "blue-white" column could be identified by disposing a blue and a white colored mark above each row in place of the graphic indicia BL-W.

In the exemplary embodiment of the terminal, at the rear face of the terminal board, a color conductor is attached to each of the lugs at the back of the terminal board. These conductors comprise leads and are color matched to the color of the stripes representing that line of lugs to which the leads are attached. For example, all of the leads in the top row will be white, all of the leads in the second row will be blue, all of the leads in the third row will be white, etc.

It will now be appreciated that in a single vertical column there are provided 25 pairs of color differentiated lugs to which are attached 25 pairs of leads at the rear face. Since the pairs of leads attached to pairs of lugs in each of the vertical columns have the same color combinations, the leads from each vertical column are differentiated from the other vertical columns by placing a binder, as at 36, around each group of 25 pairs of leads. As previously mentioned, each 25 pairs of leads in the cables are also color identified by the binder which secures the 25 pairs in a bundle. The binder colors for each vertical row match the color indicia identifying such row on the front face of the terminal board. Since only 600 pair are contained in a cable, there are 24 rather than 25 groups, and the last color group, namely, violet-slate, is not present.

In practice, the cable 11 is passed through the terminal 10 exposing all of the groups of the color-coded conductors. If it is contemplated that 200 pairs will be terminated at this particular distribution point, eight groups of pairs will be spliced to the leads extending from the lugs at the rear face of the terminal board. The first group which would be spliced would be that group having the blue-white binder and each of the pairs therein would be spliced to each vertically disposed pair of lugs commencing the blue-white and ending with violet-slate. Then, the second group having the orange-white binder would be spliced to the leads extending from the second vertical column which is color identified as orange-white. The remainder of the groups and wires in the cable 11 will pass out of the terminal to a further distribution point.

The cable 12 which also extends into the terminal 10 will also include a plurality of groups each having a color identifiable binder to distinguish it from other groups and each group containing 25 color differentiated pairs. These groups are again attached to other vertical columns with matching graphic color indicia through the leads connected to the lugs extending from the rear face of the terminal board. There may be 400 such pairs comprising 16 groups in the distribution cable 11 not all of which will be used. However, unused pairs in the distribution cable represent a minor investment compared with unused pairs in the cable coming from the central office since these pairs are alive and utilize the facilities of the central office.

When service through the terminal 10 is to be completed, the installer need only connect a pair of lugs in one column at the front face of the terminal board which are connected to a pair of conductors in the cable interconnecting the central office with the terminal to a second pair of lugs in a different column which are connected to a pair of conductors in the other cable interconnecting the ultimate distribution point with the terminal 10. These connections are made with indiscriminately colored jumper wires 45 as seen in FIG. 2 passing through the bracket 28 to prevent entanglement. Such selective interconnection between pairs of color identifiable lugs effects interconnection between pairs of conductors in the cable 11 with pairs of conductors in the other cable 12 through the terminal board. An installation order requesting the installer to run such jumper wire 45 would simply indicate that the jumper wire must, for example, be attached to the blue-white pair in the blue-white column to the orange-white pair in the green-white column. Such instructions would obviously be more simple than requiring the installer to run a jumper from Cable 7, Pair 117 to Cable 7, Pair 391 in a terminal whose cable pairs are poorly identified.

It will be readily appreciated that the objects and advantages of the present invention are accomplished by the exemplary embodiment of the terminal improvement described and shown. The terminal facilitates the interconnection between color-coded pairs of conductors in an input and output cable by carrying the color code scheme or system through the terminal board so that the installer need not rely upon stenciled or stamped information regarding cable and pair on the terminal board face. Other modifications and variations of the present invention are possible in light of the above teaching. It is therefore to be understood that within the scope of the appended claims, the invention may be practiced otherwise than as specifically described.

I claim:

1. In a telephone communication system including cables interconnecting a first location with a second location through at least one terminal, each of the cables including a plurality of telephone conductor pairs, each pair including two different colored conductors, no two pair having the same two different colored conductors, so that each pair is individually color identifiable, the improvement in the terminal comprising:

a terminal board having a front and rear face;

a plurality of lugs extending from the rear face to the front face of said terminal board, said lugs arranged in substantially straight lines comprising rows in one direction and columns in the normal direction;

means for visual identification of lug pairs comprising means for color identification of each line of lugs extending in said one direction, each pair of adjacent lines of lugs in said one direction comprising two different colored lines, no two pair of lug lines having the same two different colors;

indicia means for identification of each line of lugs extending in the direction, normal to said one direction each such line comprising a plurality of lug pairs, each pair including one lug from one of said pair of adjacent different colored lines of lugs;

pairs of conductors in one of said cables interconnecting said first location with said terminal connected to lug pairs having matching color identification at the rear face of said board, and pairs of conductors in one of the other of said cables interconnecting said second location with said terminal connected to other lug pairs of matching color identification at the rear face of said board; and jumper wires selectively interconnecting one pair of identifiable lugs to which a conductor pair in said first cable is connected to another pair of identifiable lugs to which a conductor pair in said second cable is connected, thereby selectively interconnecting a pair of conductors in said one cable to a pair of conductors in said other cable through said terminal board.

2. The improvement of claim 1 wherein said means for color identification of each line of lugs extending in one direction comprises a colored stripe coating on the face of said board behind said line of lugs.

3. The improvement of claim 1 wherein said indicia means comprises characters disposed on the face of said board adjacent at least one end of each line of lugs extending in the normal direction.

4. The improvement of claim 2 wherein there are ten different colors for said conductors and said stripes representing 25 pairs each comprising two different color conductors.

5. The improvement of claim 4 wherein each 25 pair comprise a group, and additionally comprising a binder for each group, each of said binders having two stripes comprising two of 10 different colors matching the 10 different colors of said conductors and stripes, all pairs in any one of said groups attached to one of said lug lines extending in the normal direction.

6. The improvement of claim 5 wherein said indicia means for identification of each line of lugs extending in the normal direction comprises an alphabetical code wherein a letter or pair of letters comprise a symbol representing each of the 10 colors and two of said symbols are disposed adjacent at least one end of each lug line extending in the normal direction so as to identify each of said lines with a group.

7. The improvement of claim 6 wherein a color conductor is attached to each of said lugs from the rear face of said terminal board, each of said conductors having a color matching the color of the lug to which it is attached, and pairs of said conductors adopted to be spliced to conductor pairs in said one cable interconnecting said terminal with said one of said locations.

8. A color-coded terminal interconnecting color-coded telephone conductor pairs in an input cable to color-coded telephone conductor pairs in an output cable, each conductor pair in each of said cables being color differentiated from every other conductor pair in that cable, comprising:

a terminal board having a front and rear face;

a plurality of lugs extending from the front face to the rear face of said board, said lugs arranged in horizontal rows and vertical columns, each of said rows being of a single color, each pair of adjacent rows differentiated from every other pair of adjacent rows, each pair of adjacent colored rows matching one of the pair of colored conductors, and each column being color differentiated from every other column;

conductors pairs in said input cable connected to lug pairs having matching colors in a column at the rear face of said board, and conductor pairs in said output cable connected to lug pairs having matching colors in a different column; and indiscriminately colored wires selectively interconnecting a pair of colored lugs in one column with a pair of colored lugs in another column so as to interconnect a selected pair of conductors in said first cable with a selected pair of conductors in said second cable.

9. The color-coded terminal of claim 8 wherein said columns are color differentiated by graphic indicia adjacent each column, each of said indicia matching one of the pair of colored conductors.